(12) United States Patent
Feustel et al.

(10) Patent No.: US 6,372,918 B1
(45) Date of Patent: Apr. 16, 2002

(54) COMPOUND FOR INHIBITING CORROSION

(75) Inventors: Michael Feustel, Köngernheim; Peter Klug, Grossostheim, both of (DE)

(73) Assignee: Clariant GmbH, Frankfurt (DE)

( * ) Notice: Subject to any disclaimer, the term of this patent is extended or adjusted under 35 U.S.C. 154(b) by 34 days.

(21) Appl. No.: 09/607,819

(22) Filed: Jun. 30, 2000

(30) Foreign Application Priority Data

Jul. 2, 1999 (DE) .......................................... 199 30 683

(51) Int. Cl.⁷ .................... C07D 233/14; C07D 233/22; C07C 233/05; C09K 3/00; C23F 11/00
(52) U.S. Cl. .................... 548/349.1; 252/387; 252/390; 252/392; 252/394; 548/350.1; 564/201
(58) Field of Search ...................... 548/349.1; 564/201; 502/387, 390, 392, 394

(56) References Cited

U.S. PATENT DOCUMENTS

| | | | | |
|---|---|---|---|---|
| 2,211,001 A | * | 8/1940 | Chwala | ................ 548/350.1 |
| 2,267,965 A | * | 12/1941 | Wilson | ................ 548/350.1 |
| RE23,227 E | * | 5/1950 | Blair et al. | .......... 548/350.1 X |
| 2,695,884 A | * | 11/1954 | Smith | ................ 548/350.1 X |
| 2,917,376 A | * | 12/1959 | Stromberg et al. | ... 548/349.1 X |
| 4,044,034 A | * | 8/1977 | Christiansen | ........ 548/350.1 X |
| 5,154,841 A | * | 10/1992 | Tucker et al. | ................. 252/86 |

FOREIGN PATENT DOCUMENTS

FR        2 407 258        5/1979

OTHER PUBLICATIONS

Derwent Patent Family Abstract for FR 2 407 258.

\* cited by examiner

Primary Examiner—Floyd D. Higel
(74) Attorney, Agent, or Firm—Richard P. Silverman

(57) ABSTRACT

The invention relates to compounds of the formula 1

$$R^1-O-(A-O)_x-(CH_2)_y-R^2 \qquad (1)$$

in which $R^1$ is branched or straight-chain $C_4$–$C_{30}$-alkyl, $C_4$–$C_{30}$-alkenyl or $C_4$–$C_{30}$-alkylaryl, A is $C_2$–$C_4$-alkylene, x is an integer from 1 to 100, y is 1, 2, 3 or 4 and $R^2$ is a radical selected from structures of the formulae 2 and 3

$$-CO-NR^3R^4 \qquad (2)$$

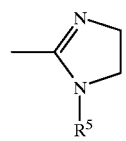

(3)

in which one of the radicals $R^3$ and $R^4$ is a hydrocarbon chain which has at least one free NH or $NH_2$ group and the other radical is hydrogen or a hydrocarbon chain which has at least one free NH or $NH_2$ group and $R^5$ is hydrogen or a hydrocarbon chain which has at least one free NH or $NH_2$ group.

6 Claims, No Drawings

COMPOUND FOR INHIBITING CORROSION

CROSS-REFERENCES TO RELATED APPLICATIONS

The present invention is described in the German priority application No. 19 930 683.4, filed Feb. 7, 1999, which is hereby incorporated by reference as is fully disclosed herein.

FIELD OF THE INVENTION

The present invention relates to an additive and a process for corrosion inhibition on apparatuses for conveying and transporting hydrocarbons in oil production and processing.

BACKGROUND OF THE INVENTION

In industrial processes in which metals come into contact with water or with oil/water two-phase systems there is the danger of corrosion. This danger is particularly pronounced especially in salt water systems as occur in oil production and processing processes. Without special additives for protecting the equipment used, exploitation of a deposit and processing of the oil are incomplete.

Although such corrosion inhibitors have long been known, they are in many respects still inadequate. Many products, for example amides/imidazolines obtained from fatty acids and polyamines, are too oil-soluble and, owing to the unfavorable partitioning, are present in the corrosive water phase only in low concentration. They are therefore not very effective as corrosion inhibitors.

FR-A-2 407 258 describes amides of carboxymethylated oligomeric polyethylene glycol monoalkyl ethers having the structure $RO(CH_2CH_2O)_nCH_2CONR^1R^2$, in which R is an aliphatic radical having 8–20 carbon atoms or a phenyl radical substituted by a $C_8$–$C_{12}$-alkyl radical and $R^1$ and $R^2$ are hydrogen or alkyl radicals having at least 3 carbon atoms, and their use as corrosion inhibitors, detergent additives or antipollution additives for fuels. However, these amides no longer have any free amino functions and are less effective than the product according to the invention.

SUMMARY OF THE INVENTION

It was the object of the present invention to provide corrosion inhibitors which offer good or improved corrosion protection and also have improved water solubility compared with the corrosion inhibitors of the prior art.

As has now surprisingly been found, amidoamines/imidazolines which are obtainable from the reaction of polyglycol ethercarboxylic acids with polyamines exhibit these properties.

DESCRIPTION OF THE PREFERRED EMBODIMENTS

The invention relates to compounds of the formula 1

$$R^1-O-(A-O)_x-(CH_2)_y-R^2 \quad (1)$$

in which
- $R^1$ is branched or straight-chain $C_4$–$C_{30}$-alkyl, $C_4$–$C_{30}$-alkenyl or $C_4$–$C_{30}$-alkylaryl,
- A is $C_2$–$C_4$-alkylene,
- x is an integer from 1 to 100,
- y is 1, 2, 3 or 4 and
- $R^2$ is a radical selected from structures of the formulae 2 and 3

$$-CO-NR^3R^4 \quad (2)$$

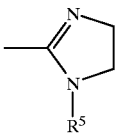

in which one of the radicals $R^3$ and $R^4$ is a hydrocarbon chain which has at least one free NH or $NH_2$ group and the other radical is hydrogen or a hydrocarbon chain which has at least one free NH or $NH_2$ group and $R^5$ is hydrogen or a hydrocarbon chain which has at least one free NH or $NH_2$ group.

The invention furthermore relates to the use of the compounds thus defined as corrosion inhibitors.

In a preferred embodiment, $R^1$ is a $C_8$–$C_{24}$-, in particular a $C_{12}$–$C_{18}$-alkyl or alkenyl radical. $R^1$ is an aromatic radical; thus, a phenyl radical with alkyl substitution of from 4 to 12 carbon atoms is preferred.

A is preferably an ethylene or propylene radical, in particular an ethylene radical. X is preferably a number from 1 to 30, in particular 2 to 15.

Y is preferably 1 or 2, preferably 1.

The substituent $R^2$ must be a free primary or secondary amino group. In one embodiment, this can be effected by one of the substituents $R^3$, $R^4$ or $R^5$ being hydrogen. If $R^2$ is of the formula 2, $R^3$ and $R^4$ cannot simultaneously be hydrogen. If $R^2$ is of the formula 3, $R^5$ may be hydrogen.

The radicals $R^3/R^4$ or $R^5$ may be hydrocarbon chains which contain at least one free primary or secondary amino group. In a preferred embodiment, said hydrocarbon chains comprise 1 to 10 primary and/or secondary amino groups. The hydrocarbon chains moreover preferably contain 1 to 30, in particular 1 to 20, carbon atoms. In addition to the nitrogen atoms which form the primary and/or secondary amino groups, the hydrocarbon chains can contain further heteroatoms. If they contain further heteroatoms, oxygen is preferred.

The compounds according to the invention, as defined above, can be prepared by condensation of ethercarboxylic acids having the structure $R^1-O(A-O)_x-(CH_2)_y-COOH$ with polyamines having at least one primary or secondary amino function.

The parent ethercarboxylic acids can be prepared by known routes, either by reaction of $C_4$–$C_{30}$-alcohol or alkylphenol reacted with ethylene oxide and/or propylene oxide, preferably with ethylene oxide, and subsequent oxidation of the terminal $CH_2OH$ function of the carboxylic acid, or by alkylation with chloroacetic acid derivatives according to the Williamson ether synthesis. Suitable parent alcohols are $C_4$–$C_{30}$ fatty alcohols, such as butanol, isobutanol, pentanol, hexanol, n-octanol, dodecanol, tetradecanol, hexadecanol, octadecanol and fatty alcohol cuts of natural or synthetic origin, such as oleyl alcohol, stearyl alcohol, behenyl alcohol and oxo alcohols of various chain lengths. Also suitable are branched alcohols, such as 2-ethylhexanol, isononyl alcohol, isodecanol, isotridecanol or isooctadecanol, and alkylphenols having a $C_1$–$C_{12}$-alkyl radical, such as nonylphenol.

These alcohols are reacted with alkylene oxides, such as ethylene oxide, propylene oxide or butylene oxide or mixtures thereof, particularly preferably ethylene oxide, to give the corresponding glycol ether. The products are preferably reacted with 1–30 mol of alkylene oxide, preferably 2–15 mol of alkylene oxide.

The ethercarboxylic acid can be prepared from these alkylene glycol monoalkyl ethers by oxidation with atmospheric oxygen in the presence of catalysts or by oxidation with hypochlorite or chlorite with or without catalysts. Particularly preferred is the alkylation of the glycol ethers with chloroacetic acid derivatives, preferably with sodium chloroacetate and sodium hydroxide solution by the Williamson method. The free carboxylic acid is obtained from the alkaline alkylating mixture by acidification with mineral acid (hydrochloric or sulfuric acid) and heating above the cloud point and isolation of the organic phase. The amides or imidazolines according to the invention are prepared from these ethercarboxylic acids by heating with polyamines and distilling off water.

The molar ratio of ethercarboxylic acid to polyamine is chosen so that not all available nitrogen atoms are converted into amides, so that free amino groups are retained in the end product.

Suitable amines are alkylamines having at least 2 and not more than about 10 nitrogen atoms. Examples of these are ethylenediamine, 2-aminoethylethanolamine, propylenediamine, diethylenetriamine, dipropylenetriamine, triethylenetetramine, tetraethylenepentamine, pentaethylenehexamine and industrial cuts of these amines. Furthermore, cyclic polyamines such as aminoethylpiperazine, piperazine or bis(aminoethyl) piperazine or 3-morpholinopropylamine are suitable. The condensation of ethercarboxylic acid and polyamine can be carried out with and without catalysts, and the reaction temperature here is in the temperature range of 100–220° C., preferably 140–200° C. For better removal of the water of reaction, reduced pressure can be applied (down to about 1 mbar). This is necessary in particular when the desire is to achieve high contents of imidazoline in the end product. The products according to the invention are then obtained as yellowish to brown, clear oils.

The products according to the invention can be used alone or in combination with other known corrosion inhibitors. In general, the corrosion inhibitor according to the invention is used in an amount such that sufficient corrosion protection is obtained under the given conditions. Typical concentrations for use, based on 100% active substance, are 5–100 ppm, preferably 10–30 ppm. Mixtures of the products according to the invention with other corrosion inhibitors known from the literature, such as amidoamines and/or imidazolines obtained from fatty acids and polyamines and their salts, quaternary ammonium salts, oxyethylated/oxypropylated amines, amphoglycinates and -propionates or betaines, are also particularly suitable as corrosion inhibitors.

EXAMPLES

As shown by the examples below, the products all have very good corrosion protection properties in low dosage.

Example 1

548.1 g (1.00 mol) of an ethercarboxylic acid based on $C_{12/14}$-fatty alcohol+1.8 mol of ethylene oxide (moles used determined from the acid number; obtained from this precursor by Williamson ether synthesis) and 103.2 g (1.00 mol) of diethylenetriamine were combined under a nitrogen atmosphere in a 1 l four-necked flask having a stirrer and distillation bridge, the mixture heating up to 60° C. This was followed by heating to 150° C. At this temperature, water was distilled off for 2 h, the mixture was further heated to 180° C. and water was again distilled off for 2 h, altogether 53.4 g of water being separated off. Reduced pressure was applied, and a further 88.8 g of an amine/water mixture were obtained as a distillate in the course of 2 h at 22 mbar. After cooling, the remaining dark oil was filtered off. 498.8 g of a brown, clear oil having an acid number of 2.9 mg KOH/g, 2.09% of basic nitrogen and a viscosity of 243 mPas at 20° C. were obtained.

Example 2

667.8 g of a clear, brown oil having an acid number of 4.5 mg KOH/g, 1.85% of basic nitrogen and a viscosity of 365 mPas at 20° C. were obtained under reaction conditions analogous to Example 1 from 665.9 g (1.00 mol) of an ethercarboxylic acid based on oleyl/cetyl alcohol+2.0 mol of ethylene oxide and 103.2 g (1.00 mol) of diethylenetriamine.

Example 3

The procedure was analogous to Example 1. 711.9 g of a clear, brown oil having an acid number of 0.7 mg KOH/g, 1.65% of basic nitrogen and a viscosity of 423 mPas at 20° C. were obtained from 786.7 g (1.00 mol) of an ethercarboxylic acid based on oleyl/cetyl alcohol+8.0 mol of ethylene oxide and 103.2 g (1.00 mol) of diethylenetriatnine.

Example 4

The procedure was analogous to Example 1. 694.8 g of a clear, brown oil having an acid number of 2.2 mg KOH/g, 1.51% of basic nitrogen and a viscosity of 380 mPas at 20° C. were obtained from 743.3 g (1.00 mol) of an ethercarboxylic acid based on $C_{14/15}$-oxo alcohol+7.0 mol of ethylene oxide and 103.2 g (1.00 mol) of diethylenetriamine.

Example 5

783 g of a clear, brown oil having an acid number of 2.4 mg KOH/g, 2.94% of basic nitrogen and a viscosity of 386 mPas at 20° C. were obtained under reaction conditions analogous to Example 1 from 729 g (1.00 mol) of an ethercarboxylic acid based on $C_{14/15}$-oxo alcohol+7.0 mol of ethylene oxide and 129 g (1.00 mol) of N-aminoethylpiperazine.

Example 6

751 g of a clear, brown oil having an acid number of 3.0 mg KOH/g, 2.12% of basic nitrogen and a viscosity of 562 mPas at 20° C. were obtained under reaction conditions analogous to Example 1 from 729 g (1.00 mol) of an ethercarboxylic acid based on $C_{14/15}$-oxo alcohol+7.0 mol of ethylene oxide and 94.7 g (0.50 mol) of tetraethylenepentamine.

Example 7

743 g (1.00 mol) of an ethercarboxylic acid based on $C_{14/15}$-fatty alcohol+7 mol of ethylene oxide (moles used determined from the acid number; obtained from this precursor by Williamson ether synthesis, and 103.2 g (1.00 mol) of diethylenetriamine were combined under a nitrogen atmosphere in a 1 l four-necked flask having a stirrer and distillation bridge, the mixture heating up to 60° C. Heating was then effected to 150–160° C. At this temperature, water was distilled off for 1 h, altogether 54.3 g of water being separated off. After cooling, the remaining yellow oil was filtered. 771 g of a yellow, clear oil having an acid number of 5.0 mg KOH/g, 2.97% of basic nitrogen and a viscosity of 457 mPas at 20° C. were obtained.

Corrosion Protection Tests

The products were tested in the Shell wheel test. Coupons of C steel (DIN 1.1203 with 15 cm² surface area) were immersed in a salt water/petroleum mixture (9:1.5% strength NaCl solution adjusted to pH 3.5 with acetic acid) and exposed to this medium at a speed of 40 rpm at 70° C. for 24 h. The inhibitor dose comprised 50 ppm of a 40% solution of the inhibitor. The protection values were calculated from the decrease in the mass of the coupons, based on a blank value.

| Example | Protection |
|---------|------------|
| 1 | 81–84 |
| 2 | 82–85 |
| 3 | 81–83 |
| 4 | 82–85 |
| 5 | 80–82 |
| 6 | 84–87 |
| 7 | 86–88 |

The products were also tested in the LPR test (test conditions analogous to ASTM D 2776):

| Example | Protection after 10 min | 30 min | 60 min |
|---------|------|------|------|
| 1 | 4.6 | 67.8 | 93.1 |
| 2 | 31.4 | 70.6 | 84.3 |
| 3 | 78.2 | 87.4 | 90.8 |
|   | 83.7 | 90.1 | 92.4 |
| 4 | 83.9 | 93.8 | 96.3 |
|   | 76.2 | 91.3 | 94.6 |
| 5 | 86.1 | 92.6 | 94.8 |
|   | 85.4 | 91.3 | 94.1 |
| 6 | 85.1 | 92.1 | 94.1 |
|   | 90.9 | 95.3 | 96.2 |
| 7 | 81.3 | 86.5 | 90.8 |

What is claimed is:

1. A compound of the formula 1

$$R^1-O-(A-O)_x-(CH_2)_y-R^2 \quad (1)$$

in which

R¹ is branched or straight-chain $C_4$–$C_{30}$-alkyl, $C_4$–$C_{30}$-alkenyl or $C_4$–$C_{30}$-alkylaryl, A is $C_2$–$C_4$-alkylene, x is an integer from 1 to 100, y is 1, 2, 3 or 4 and R² is a radical selected from structures of the formulae 2 and 3

$$-CO-NR^3R^4 \quad (2)$$

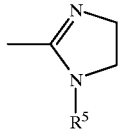
(3)

in which one of the radicals R³ and R⁴ is a hydrocarbon chain which has at least one free NH or $NH_2$ group and the other radical is hydrogen or a hydrocarbon chain which has at least one free NH or $NH_2$ group and R⁵ is hydrogen or a hydrocarbon chain which has at least one free NH or $NH_2$ group.

2. The compound as claimed in claim 1, in which A is an ethylene or propylene radical.

3. The compound as claimed in claim 1, in which X is an integer from 1 to 30.

4. The compound as claimed in claim 1, in which R¹ is a $C_{12}$–$C_{18}$-alkyl or alkenyl radical.

5. The compound as claimed in claim 1, in which y is 1.

6. A process for inhibiting corrosion in metals which contact water comprising adding an effective dosage of the compound of claim 1 to the water.

\* \* \* \* \*